(No Model.) 7 Sheets—Sheet 1.

R. WEISS.
CIRCULAR LOOM.

No. 590,123. Patented Sept. 14, 1897.

Witnesses:
Thomas Durant
Wallace Murdock

Inventor:
Rudolph Weiss
by Church & Church
his Attys.

(No Model.) 7 Sheets—Sheet 2.

R. WEISS.
CIRCULAR LOOM.

No. 590,123. Patented Sept. 14, 1897.

Witnesses:
Thomas Durant
Wallace Murdoch

Inventor:
Rudolph Weiss,
by Church & Church
his Attys (No Model.)  7 Sheets—Sheet 3.
R. WEISS.
CIRCULAR LOOM.
No. 590,123.  Patented Sept. 14, 1897.
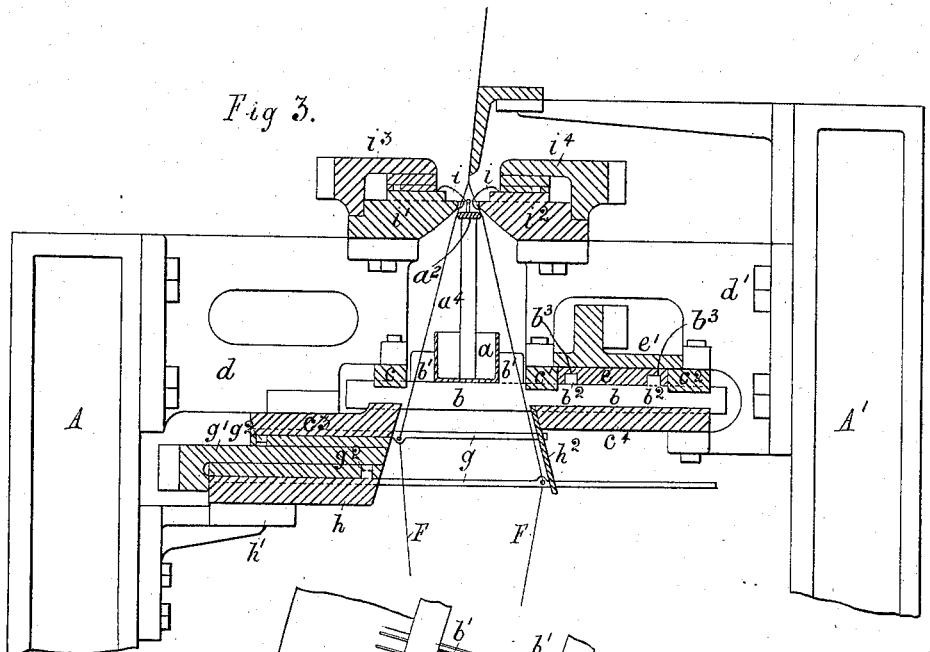
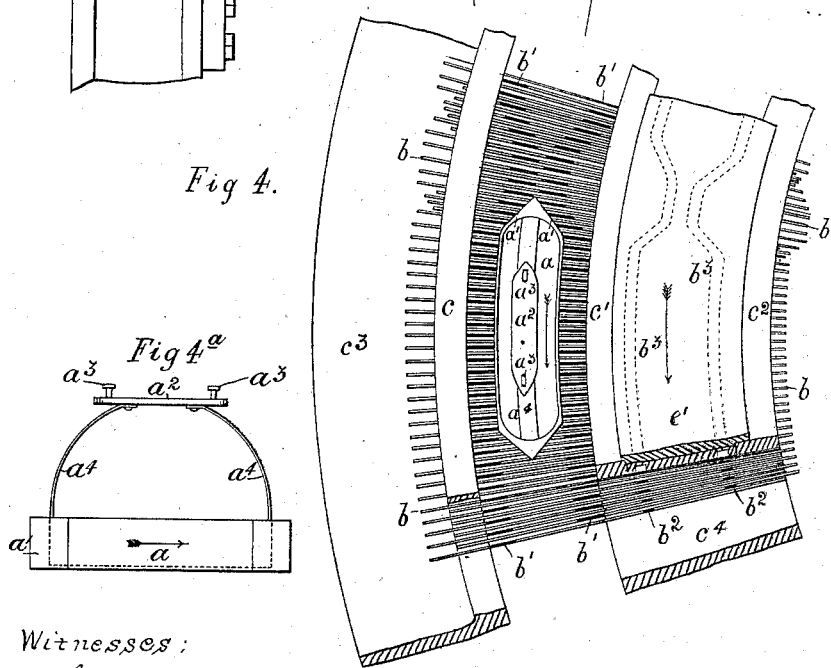
Witnesses:
Thomas Durant
Nathan Murdock
Inventor:
Rudolph Weiss,
by Church & Church
his Attys.

(No Model.) 7 Sheets—Sheet 4.
R. WEISS.
CIRCULAR LOOM.
No. 590,123. Patented Sept. 14, 1897.
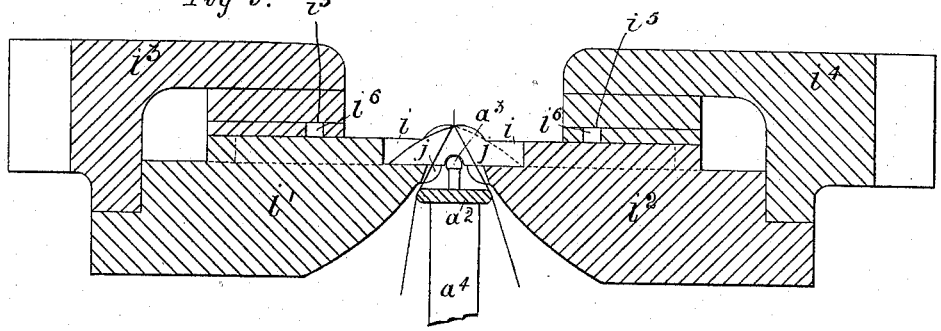
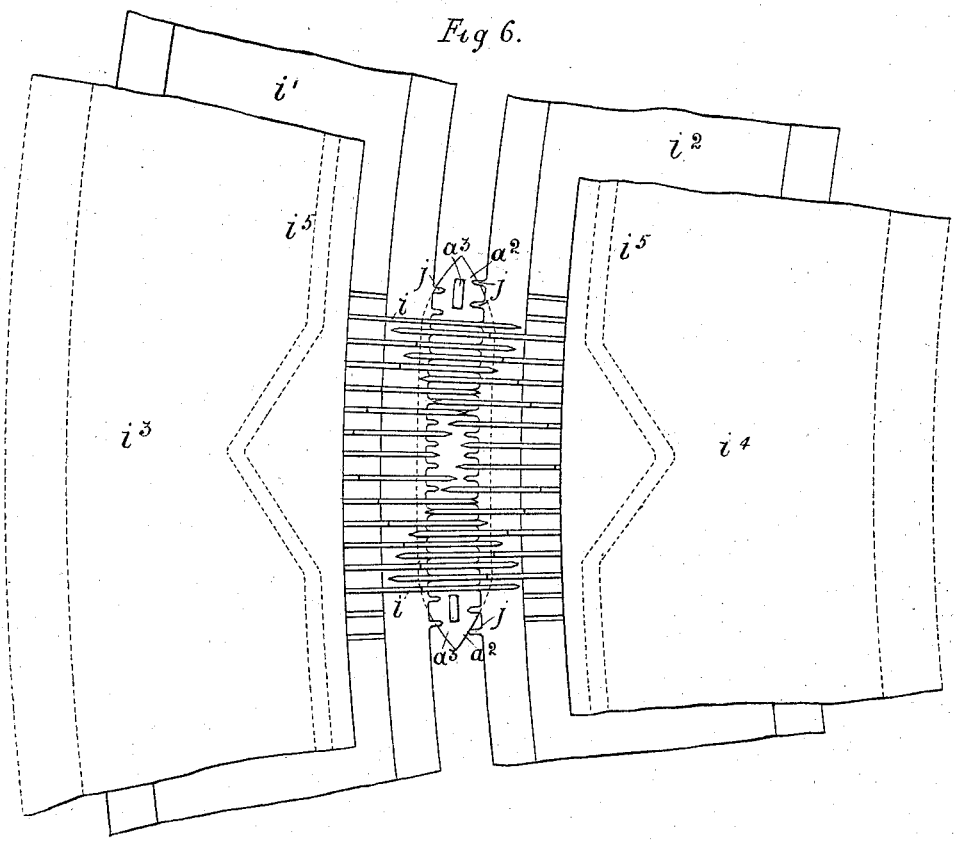
Witnesses:
Thomas Durant
Wallace Murdock
Inventor:
Rudolph Weiss.
by Church & Church
his Attys.

(No Model.) 7 Sheets—Sheet 5.

R. WEISS.
CIRCULAR LOOM.

No. 590,123. Patented Sept. 14, 1897.

Witnesses
Thomas Durant
Wallace Murdock

Inventor:
Rudolph Weiss,
by Church & Church
his Attys.

(No Model.) 7 Sheets—Sheet 6.
R. WEISS.
CIRCULAR LOOM.
No. 590,123. Patented Sept. 14, 1897.
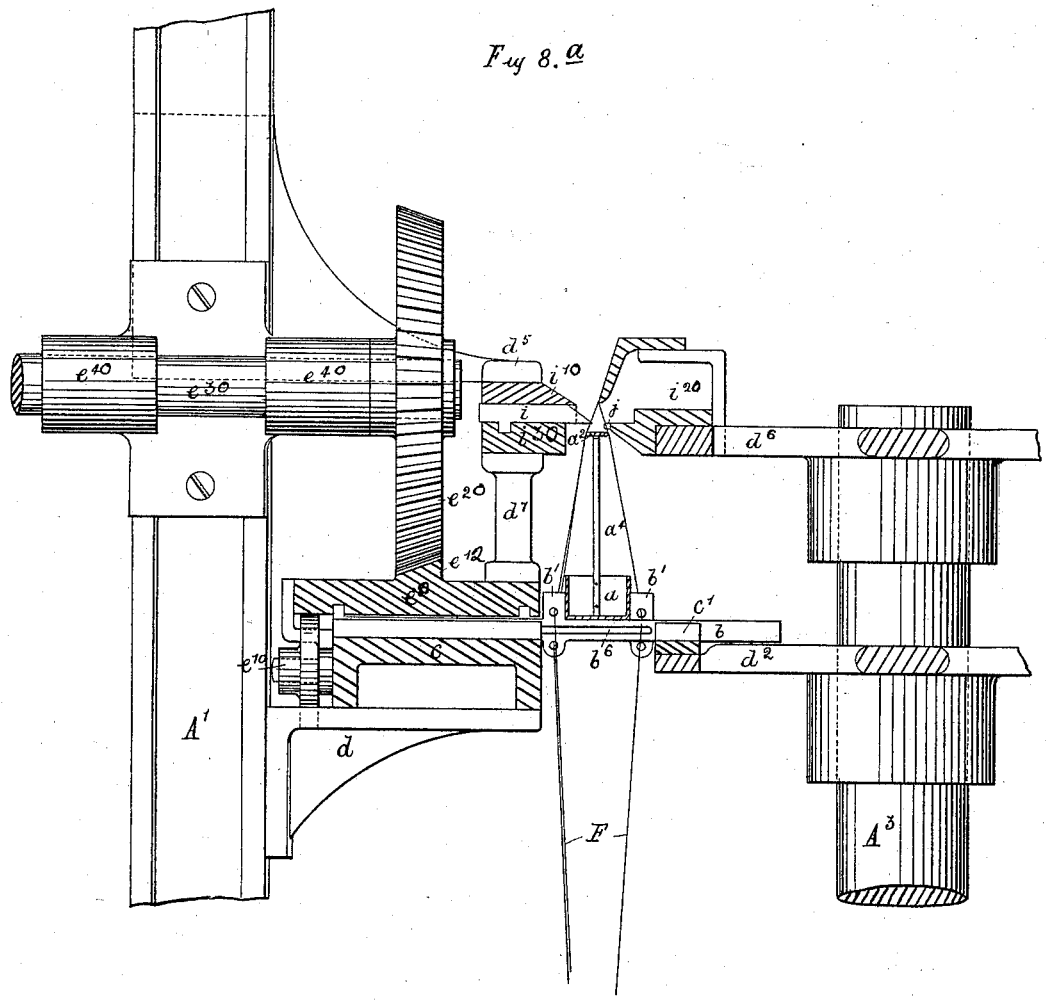
Fig. 8.ᵃ
Witnesses:
Thomas Durant
Wallace Murdock
Inventor:
Rudolph Weiss,
by Church & Church
his Atty.

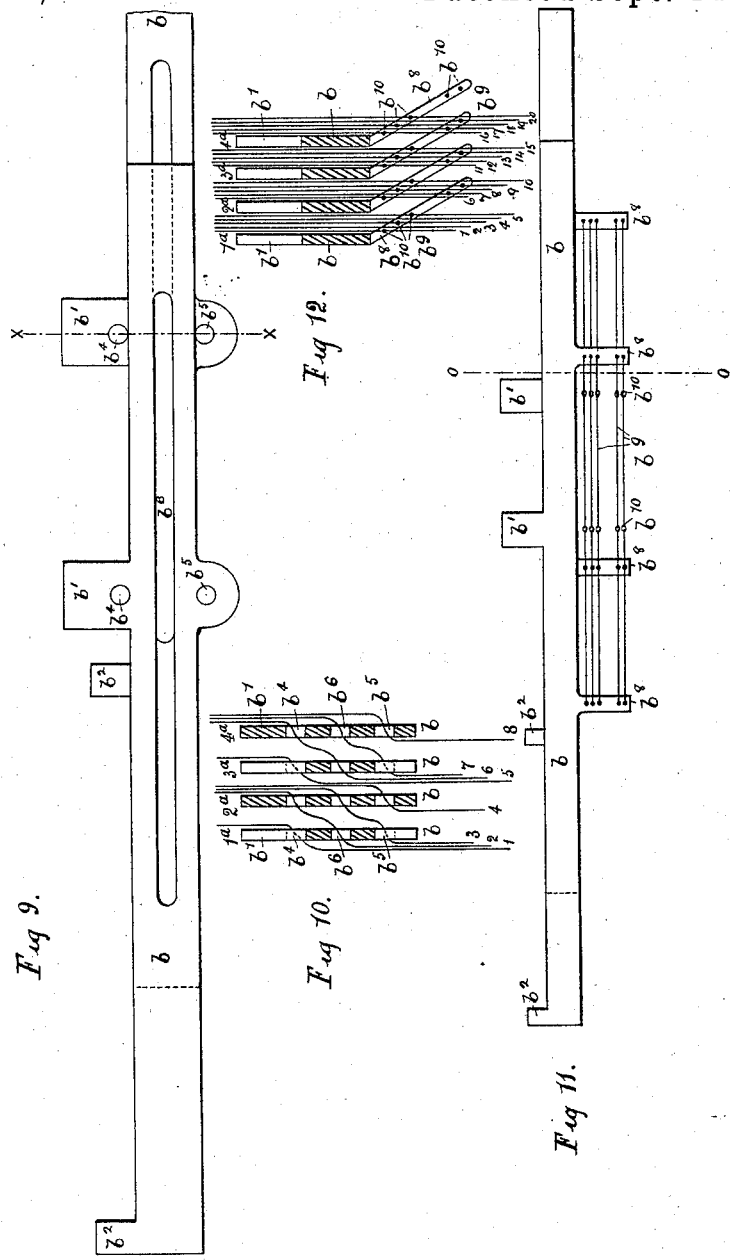

UNITED STATES PATENT OFFICE.

RUDOLPH WEISS, OF NOTTINGHAM, ENGLAND.

CIRCULAR LOOM.

SPECIFICATION forming part of Letters Patent No. 590,123, dated September 14, 1897.

Application filed July 23, 1895. Serial No. 556,919. (No model.) Patented in England January 17, 1891, No. 888; in France April 15, 1892, No. 220,954, and in Germany April 28, 1892, No. 67,853.

*To all whom it may concern:*

Be it known that I, RUDOLPH WEISS, a citizen of the Swiss Republic, residing at Nottingham, England, have invented certain new and useful Improvements in Circular Looms, (for which I have obtained Letters Patent in Great Britain, No. 888, dated January 17, 1891; in Germany, No. 67,853, filed April 28, 1892, and in France, No. 220,954, filed April 15, 1892,) of which the following is a specification.

This invention relates to weaving apparatus in which the warps are disposed so as to form a circular shed in which the shuttle or shuttles travel and have a constant motion in a circuit or path corresponding to the shed.

It will be best understood by reference to the accompanying drawings, in which—

Figure 1:
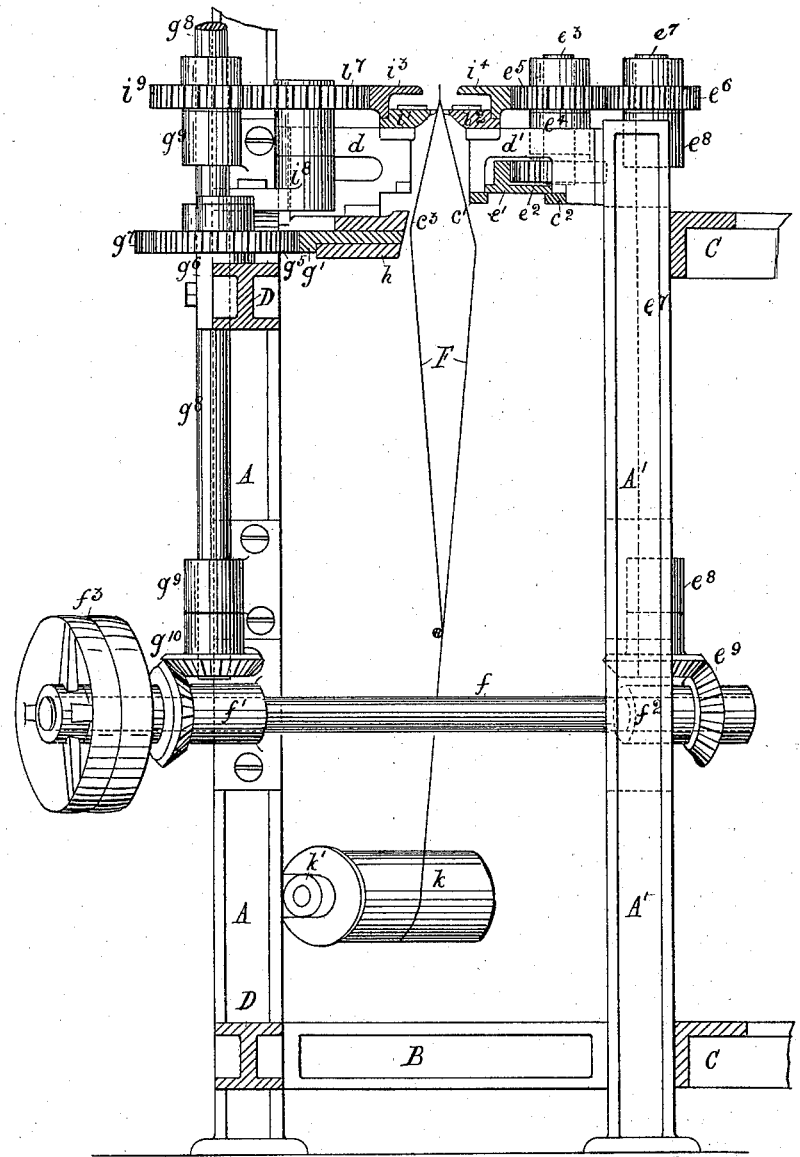
Figure 2:
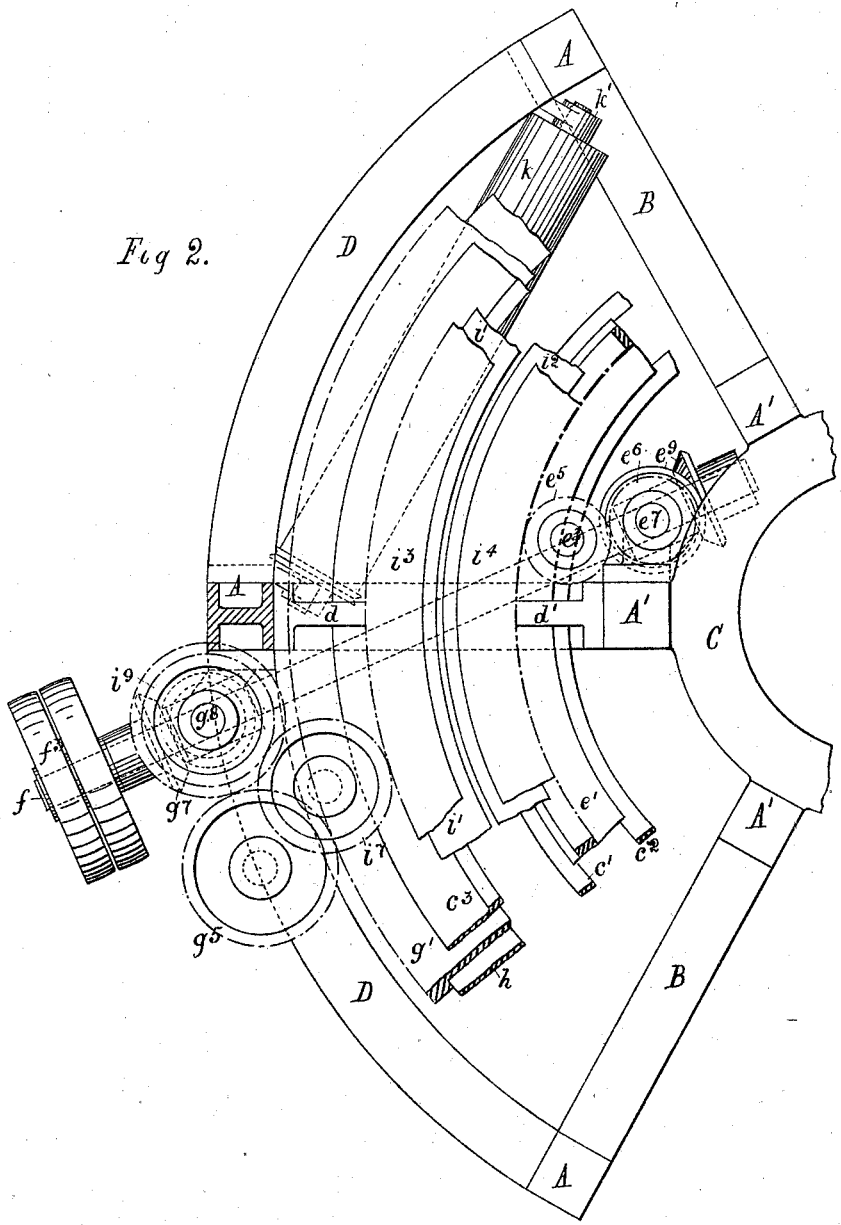
Figure 7:
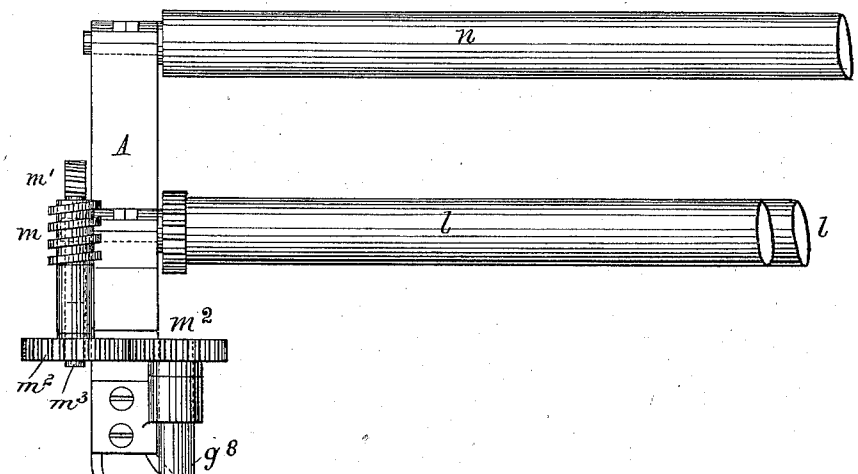
Figure 8:
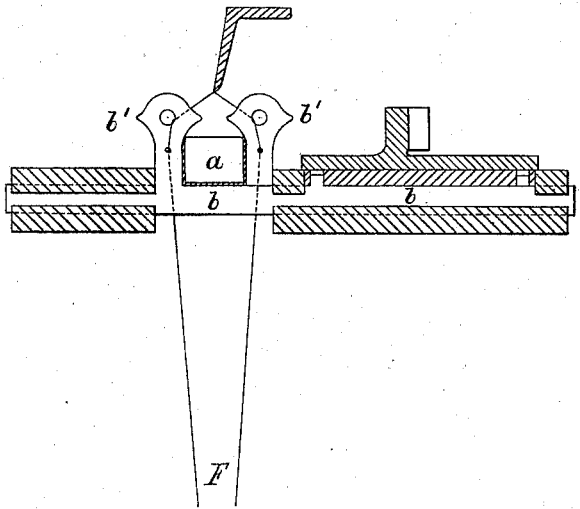

Figure 1 is a sectional elevation, and Fig. 2 is a plan, of a portion of the apparatus. Fig. 3 is a sectional elevation showing part of the same drawn to a larger scale. Fig. 4 is a plan of a shuttle and operating mechanism. Fig. $4^a$ is a side elevation of one of the shuttles. Fig. 5 is a sectional elevation, and Fig. 6 a plan, drawn to a larger scale, showing detail of beating-up mechanism. Fig. 7 is an elevation of the take-up and work rollers. Fig. 8 is a sectional elevation showing an alternative arrangement of certain of the parts. Fig. $8^a$ is a sectional elevation showing modifications in the construction of the loom. Fig. 9 is a side elevation, drawn to a larger scale, showing a modified form of jack or slider adapted to simultaneously actuate the shuttle and operate the warp-threads. Fig. 10 is a vertical cross-section of Fig. 9, on line X X. Fig. 11 is a side elevation of an alternate arrangement to that shown in Figs. 9 and 10; and Fig. 12 is a vertical cross-section of Fig. 11 on line O O, drawn to a larger scale.

Like letters and figures indicate like parts throughout the drawings.

The framing of the loom is formed by pairs of outer and inner vertical supports A A', each pair being connected by radial stays B. The inner supports A' are connected together by rings C and the outer supports A by segmental stays D, which together form an outer circular rail.

The shuttles $a$, two or more pairs of which may be employed, (see Figs. 3 and 4, where only one is shown,) are carried and operated by radial jacks or slides $b$, which are carried by outer and inner rings $c\ c'\ c^2\ c^3\ c^4$, provided with radial recesses or gates to receive the jacks $b$ and in which they freely slide. The rings are carried by brackets $d\ d'$, secured, respectively, to the vertical supports A A'.

The jacks $b$ work across the annular space between the rings $c\ c'\ c^3\ c^4$ and are provided in the said space each with a vertical extension $b'$. When in their normal position, the extension $b'$ on each alternate jack is on the right of the annular space and the extensions $b'$ on the other jacks on the left, so that an annular recess or race is formed by the jacks $b$ and their extensions $b'$, in which race the shuttles travel and through which the warp-threads F can pass.

Each of the shuttles $a$ is formed with a curve corresponding to the curve of the race in which it travels, and is provided at the rear with two oppositely-inclined surfaces $a'$. The shuttles are propelled by the action of the jacks $b$, which are operated so that their extensions $b'$ successively approach from both sides the center line of the shuttle-race.

The inner edges of the extensions $b'$, acting on the intervening double-inclined surfaces $a'$ of each shuttle, force the said shuttle forward in the same direction as the cam-ring $e$, operating the jacks $b$ in such a manner that the warp-threads cannot get displaced, dragged, or broken through being caught by or squeezed between the shuttle and the shuttle-propelling mechanism, nor be influenced, dragged, or torn by the shuttle leaning against the wall or walls of the shed.

The jacks $b$ are actuated by a cam-ring $e$, working between the rings $c'\ c^2$ and provided with two cam-grooves $b^3$, in which the heels $b^2$ of alternate jacks $b$ respectively engage.

The cam-ring $e$ is secured to an annular rack or internally-toothed ring or wheel $e'$, which is in gear with the wheel $e^2$, Fig. 1, secured to a short shaft $e^3$, carried in a bearing $e^4$, secured to the bracket $d'$. Secured to the upper end of the shaft $e^3$ is a second wheel $e^5$, which engages with a wheel $e^6$, secured to the vertical shaft $e^7$, which is carried in bearings $e^8$, secured to one of the supports A', and is connected to the main driving-shaft $f$ by bevel-wheels $e^9$.

The shedding motion is effected by radial guides $g$, arranged in two tiers and carried in radial recesses or gates on the under side of the ring $c^3$ and the upper surface of the ring $h$, the latter being carried by brackets $h'$, secured to the supports A. The inner ends of the guides $g$ are also supported by the slay-ring $h^2$, secured to the guide-ring $c^4$.

The guides $g$ may be provided with holes or other suitable arrangement for the passage therethrough of the warp-threads F and are actuated by a cam-ring $g'$, working between the rings $c^3$ and $h$ and provided with cam-grooves on its upper and lower surfaces, in which the heels $g^2$ of the guides $g$ engage, the movement of one tier being the reverse of the other, so as to actuate the warp-threads in the same manner as an ordinary loom-harness.

On the periphery of the cam-ring $g'$ are teeth engaging with an intermediate wheel $g^5$, pivoted on a bracket $g^6$, secured to the framing. The wheel $g^5$ is in gear with a wheel $g^7$, secured to the vertical shaft $g^8$, which is carried in bearings $g^9$, secured to one of the supports A, and which shaft is connected to the main driving-shaft $f$ by bevel-wheels $g^{10}$. The main shaft $f$ is carried in bearings $f'$ $f^2$, secured to the supports A A', and is provided with fast and loose pulleys $f^3$ for the driving-belt.

The beating up is effected by slides $i$, shaped as shown in Figs. 5 and 6, carried in outer and inner rings $i'$ $i^2$, secured to the brackets $d$ $d'$ and provided with radial recesses or gates to receive the slides. The slides $i$ are actuated by outer and inner cam-rings $i^3$ $i^4$, provided with cam-grooves $i^5$, in which the heels $i^6$ of the slides $i$ engage. The inner edge of the inner cam-ring $i^4$ is formed with teeth, which engage with the before-mentioned wheel $e^5$ on the short shaft $e^3$. The outer edge of the outer cam-ring $i^3$ is also formed with teeth, which engage with an intermediate wheel $i^7$, pivoted to a bracket $i^8$, Fig. 1, secured to the framing, and this intermediate wheel engages with a wheel $i^9$, secured to the before-mentioned vertical shaft $g^8$.

The slides $i$ are disposed so that every alternate one is operated by the outer cam-ring $i^3$ and the remainder by the inner cam-ring $i^4$, so that when beating up they act in opposite directions and their ends cross each other, as shown. The inner edge of the ring $i'$ and the outer edge of the ring $i^2$ are provided with projections or teeth $j$, which divide the space between the slides $i$ in each ring, so as to prevent the warp-threads from moving from one side of the space to the other when the slides are withdrawn to admit the shuttle-thread. For this purpose also the shedding motion is effected while the slides $i$ are in their inner or closed position, so that the threads will take their proper position before the slides are withdrawn to admit the shuttle-thread. With this arrangement the number of slides $i$ per inch may correspond with the number of warp-threads employed per inch—that is, the gage of the fabric—while the jacks $b$ may be less in number, two or more threads passing between each, and consequently may be of a thickness and strength required for the propulsion of the shuttle.

Secured to each shuttle $a$ by preferably a spring or springs $a^4$ is a plate $a^2$, of conveniently the shape shown, the forward pointed end of which divides the warp-threads and holds them in the teeth $j$ while the slides $i$ are open. The plate $a^2$ may be provided with a hole or guide for the passage of the shuttle-thread and also with two vertical extensions $a^3$, which run in a groove formed by a series of notches cut one in the under side of each slide $i$, the position of which notches coincides with the center line of the shuttle-race when the slides $i$ are closed. This prevents the shuttles from jumping and insures the shuttle-threads being laid in the exact position required.

As the notches in the slides $i$ only coincide and form a groove for the passage of the extensions $a^3$ when they are closed, the extensions $a^3$ are placed one at each end of the plate $a^2$, so that the slides $i$ between the two extensions $a^3$ may be opened to admit of the laying in of the shuttle-thread.

The extensions $a^3$ keep the plate $a^2$ in such a position as to prevent squeezing of the warp-threads F between the plate $a^2$ and the rings $i'$ and $i^2$, while at the same time this means of supporting the plate centrally between the rings $i'$ and $i^2$ insures the retention of the warp-threads between the teeth or projections $j$ of both rings $i'$ and $i^2$ at the time the slides are open or withdrawn to admit the shuttle-thread.

The warp-threads are carried on beams $k$, supported in bearings $k'$, secured to the supports A. The take-up mechanism consists of two rollers $l$, carried centrally above the loom in bearings secured to or formed in two of the vertical supports A, which two are extended for this purpose. These rollers are preferably covered with perforated or punctured zinc or other roughened material, so as to firmly grip the material between them. Motion is imparted to one of the rollers $l$ by a worm $m$ and wheel $m'$, the latter being secured to the roller-spindle and the former secured on shaft $m^3$, connected to the before-mentioned shaft $g^8$ by wheels $m^2$. The material after passing between the rollers $l$ is wound on the beam $n$, any suitable well-known arrangement being employed for taking up the slack between the rollers $l$ and beam $n$.

In an alternative arrangement shown in Fig. 8 the extensions $b'$ of the jacks $b$ are continued above the shuttle and may be shaped as shown. In this arrangement the upper parts of the extensions $b'$ are employed for beating up the shuttle-thread as it is inserted. The jacks $b$ may also be formed with holes for the passage of the warp-threads F, and by reversing the positions of the extensions $b'$—that is, moving those on the right to the extreme left and those on the left to the extreme right after each shuttle-thread is inserted—the jacks $b$ will propel one shuttle and at the same time perform the shedding motion for the following one.

In the modified arrangement shown in Fig. $8^a$ the framing of the loom is formed by outer vertical supports A' and a central pillar $A^3$, connected by radial stays, as in the previously-described arrangement. The radial jacks or slides $b$ are carried in gates or recesses in the outer and inner rings $c\ c'$, the outer ring $c$ being carried by brackets $d$, secured to the vertical supports A', and the inner ring $c'$ by a disk or ring $d^2$, secured to the central pillar $A^3$. The jacks $b$ are actuated by a cam-ring $e^0$, running on antifriction-rollers $e^{10}$, pivoted to the ring $c$ and provided with an annular rack or bevel toothed wheel $e^{12}$, which is in gear with the bevel-wheel $e^{20}$, secured to the shaft $e^{30}$, carried in bearings $e^{40}$, secured to one of the vertical supports A'. This shaft $e^{30}$ may be provided at the outer end with pulleys to receive a driving-belt.

The beating-up slides $i$ are carried in outer and inner slay-rings $i^{10}\ i^{20}$, respectively. The outer ring $i^{10}$ is carried by brackets $d^5$, secured to the vertical supports A'. The inner ring $i^{20}$, provided with teeth or projections $j$ for retaining the warp-threads in position, is carried by a disk $d^6$ or ring secured to the central pillar $A^3$.

The beating-up slides $i$ are actuated by a cam-ring $i^{30}$, connected by brackets or standards $d^7$ to the cam-ring $e^0$, so that the movement of the latter shall be imparted to the former.

In the last-described arrangement the shedding motion is effected by the jacks $b$, (see Figs. 9 and 10,) each of which is provided with holes $b^4$ in the extensions $b'$ for the passage of the warp-threads F. The movement of the jacks $b$ also effects the propulsion of the shuttle in the same manner as hereinbefore described.

In order that each jack $b$ may operate two warp-threads of one wall of the shed when the threads are disposed alternately in each wall, the jacks $b$ are provided with two holes $b^4\ b^5$ for the threads, with an intermediate longitudinal slot $b^6$ for the passage of the intermediate warp-thread of the other wall of the shed. This method of arranging the threads is illustrated in Fig. 10.

The warp-thread 1 passes through the hole $b^4$ in the jack $1^a$. Warp-thread 2 passes through the slot $b^6$ in the jack $1^a$ and through the hole $b^4$ in the jack $2^a$. Warp-thread 3 passes through the hole $b^5$ in the jack $1^a$ and through the slot $b^6$ in jack $2^a$. Warp-thread 4 passes through the hole $b^5$ in the jack $2^a$, and this is repeated throughout.

When a thread passes through a slot in a jack, it is not affected by the movement of that jack, and consequently the threads 1 3 5 7 are actuated by jacks $1^a\ 3^a$, and the threads 2 4 6 8 by jacks $2^a$ and $4^a$.

In a modified form of jack or slide shown in Figs. 11 and 12 each jack $b$ is formed with two downward extensions $b^8$. Any suitable number of harness strings or wires $b^9$ are arranged between the extensions $b^8$ and secured thereto by their ends. Each harness string or wire is provided with a mail or eye $b^{10}$ for the passage of a warp-thread.

As shown in Fig. 12, alternate threads—that is, the odd-numbered threads—are actuated by the jacks $1^a\ 3^a$, while the remaining threads—that is, the even-numbered threads—are actuated by the jacks $2^a\ 4^a$. By setting the downward projections $b^8$ at an angle to the main part $b$, as shown in Fig. 12, the angle is taken off the warp-threads and the friction on the said threads reduced.

I claim—

1. In a circular loom, the combination with the shuttle-propelling mechanism, of beating-up slides arranged on both sides of the warp-threads, slay-rings for carrying the slides, cam-rings provided with cam-races, for operating the slides, and teeth or projections on the slay-ring for retaining the warp-threads in position; substantially as described.

2. In a circular loom, the combination with the shuttle, the shuttle-propelling jacks, and cam-ring for operating said jacks, of a shuttle-thread plate, secured to and carried above the shuttle, extensions on the said plate, beating-up slides each having a notch which together form a groove to receive the shuttle-thread-plate extensions, slay-rings for carrying and cam-rings for operating the said slides, substantially as described.

3. In a circular loom, the combination with radial shuttle-propelling jacks, and a slay-ring for carrying the said jacks, of a cam-ring provided with two cam-races each race operating every alternate jack so as to move them successively across the path of the shuttle in reverse directions, cam-rings for operating the beating-up slides, brackets for connecting the said cam-ring to the jack-operating cam-ring, and an annular rack and pinion for imparting rotary motion to both cam-rings; substantially as described.

4. In a circular loom, radially-reciprocating jacks forming a shuttle propelling and shedding mechanism, each provided with two or more holes and a longitudinal slot, the holes forming a guide for two alternate threads, and the slot a passage for the thread between the two alternate threads which are operated by the other jack; substantially as described.

RUDOLPH WEISS.

Witnesses:
H. C. SHELDON,
MAURICE BILLSON.